(12) United States Patent
Matsui

(10) Patent No.: US 11,600,158 B2
(45) Date of Patent: Mar. 7, 2023

(54) INFORMATION PROCESSING APPARATUS, CONTROL METHOD, AND PROGRAM

(71) Applicant: NEC CORPORATION, Tokyo (JP)

(72) Inventor: Takahiro Matsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 670 days.

(21) Appl. No.: 16/493,857

(22) PCT Filed: Mar. 12, 2018

(86) PCT No.: PCT/JP2018/009431
§ 371 (c)(1),
(2) Date: Sep. 13, 2019

(87) PCT Pub. No.: WO2018/168743
PCT Pub. Date: Sep. 20, 2018

(65) Prior Publication Data
US 2020/0035077 A1  Jan. 30, 2020

(30) Foreign Application Priority Data
Mar. 15, 2017 (JP) .............................. JP2017-050178

(51) Int. Cl.
*G06Q 10/00* (2012.01)
*G06Q 30/06* (2012.01)
(Continued)

(52) U.S. Cl.
CPC ... *G08B 13/19645* (2013.01); *G06Q 30/0609* (2013.01); *G06V 20/52* (2022.01); *G08B 25/10* (2013.01)

(58) Field of Classification Search
None
See application file for complete search history.

(56) References Cited

U.S. PATENT DOCUMENTS 9,589,433 B1 * 3/2017 Thramann ............... G07G 3/003
2005/0108063 A1 * 5/2005 Madill ................... G06Q 40/08
705/4
(Continued)

FOREIGN PATENT DOCUMENTS

JP    9-325993 A    12/1997
JP    2004-171240 A   6/2004
(Continued)

OTHER PUBLICATIONS

Japanese Office Action for JP Application No. 2020-200842 dated Aug. 31, 2021 with English Translation.
(Continued)

*Primary Examiner* — Soo Shin
(74) *Attorney, Agent, or Firm* — Sughrue Mion, PLLC

(57) ABSTRACT

An information processing apparatus (2000) detects that a customer (30) takes up a product from a display area (20), using a captured image (12). The information processing apparatus (2000) generates information (customer information) indicating the acquisition count by the customer (30) in a manner that is associated with an identifier of the customer (30). The information processing apparatus 2000 sets the acquisition count, which is indicated by the customer information on the customer (30), in a case where the customer (30) makes payment for the products, to zero.

17 Claims, 11 Drawing Sheets

NUMBER OF TIMES THAT CUSTOMER 30 ACQUIRES PRODUCT IS MANAGED IN SUCH MANNER THAT IT CAN BE RECOGNIZED WHETHER OR NOT CUSTOMER 30 GOES OUT OF STORE WITHOUT MAKING PAYMENT FOR PRODUCTS

(51) Int. Cl.
*G06V 20/52* (2022.01)
*G08B 13/14* (2006.01)
*G08B 13/196* (2006.01)
*G08B 15/00* (2006.01)
*G08B 25/10* (2006.01)
*H04N 7/18* (2006.01)
*G06Q 30/0601* (2023.01)

(56) References Cited

U.S. PATENT DOCUMENTS

| | | | | |
|---|---|---|---|---|
| 2006/0243798 A1* | 11/2006 | Kundu | ............... | G06Q 20/4016 235/383 |
| 2007/0016524 A1* | 1/2007 | Diveley | ................. | G06Q 20/28 705/40 |
| 2007/0182818 A1* | 8/2007 | Buehler | ........... | G08B 13/19671 348/143 |
| 2008/0018738 A1* | 1/2008 | Lipton | ............. | G08B 13/19652 348/E7.087 |
| 2009/0055205 A1* | 2/2009 | Nguyen | ............... | G07F 17/3241 348/169 |
| 2013/0277423 A1* | 10/2013 | Toyokawa | ............. | G06Q 20/30 235/375 |
| 2014/0347479 A1* | 11/2014 | Givon | ................... | G06V 40/103 382/116 |
| 2016/0328604 A1* | 11/2016 | Bulzacki | ............. | G07F 17/3206 |

FOREIGN PATENT DOCUMENTS

| | | |
|---|---|---|
| JP | 2004-171241 A | 6/2004 |
| JP | 2005-347905 A | 12/2005 |
| JP | 2009-9231 A | 1/2009 |
| JP | 2012-242912 A | 12/2012 |
| WO | 2016/147770 A1 | 9/2016 |

OTHER PUBLICATIONS

Japanese Office Action far JP Application No. 2020-200842 dated Feb. 22, 2022 with English Translation.
International Search Report for PCT/JP2018/009431 dated Apr. 10, 2018 [PCT/ISA/210].

* cited by examiner

NUMBER OF TIMES THAT CUSTOMER 30 ACQUIRES PRODUCT IS MANAGED IN SUCH MANNER THAT IT CAN BE RECOGNIZED WHETHER OR NOT CUSTOMER 30 GOES OUT OF STORE WITHOUT MAKING PAYMENT FOR PRODUCTS

FIG. 2

| CUSTOMER IDENTIFIER | ACQUISITION COUNT |
|---|---|
| id1 | 10 |
| id2 | 0 |
| ... | ... |

FIG. 9

| CUSTOMER IDENTIFIER | ACQUISITION COUNT | PAYMENT FLAG |
|---|---|---|
| id1 | 10 | PAYMENT MADE |
| id2 | 0 | WITHOUT PAYMENT MADE |
| ... | ... | ... |

FIG. 11

| CUSTOMER IDENTIFIER | ACQUISITION COUNT | COMING TO THE STORE NUMBER |
|---|---|---|
| id1 | 0 | 1 |
| id1 | 5 | 2 |
| id1 | 2 | 3 |
| id2 | 0 | 1 |
| id2 | 0 | 2 |
| ... | ... | ... |

INFORMATION PROCESSING APPARATUS, CONTROL METHOD, AND PROGRAM

CROSS REFERENCE TO RELATED APPLICATIONS

This application is a National Stage of International Application No. PCT/JP2018/009431, filed on Mar. 12, 2018, which claims priority from Japanese Patent Application No. 2017-050178, filed on Mar. 15, 2017, the contents of all of which are incorporated herein by reference in their entirety.

TECHNICAL FIELD

The present invention relates to prevention of an illegal act in a store.

BACKGROUND ART

In some cases, a product is illegally carried out of a store in which products are handled. Accordingly, systems that detect such illegal carrying-out have been developed. For example, a system that is disclosed in Patent Document 1 is a system that determines whether or not there is a likelihood that a product will be illegally carried out. This system determines each displayed product that a customer takes up, compares the determined displayed product and a product that is registered as a target for payment with each other, and thus determines whether or not payment is made for all displayed products that are carried out. Then, in a case where a product for which payment is not made is present, the system determines there is a likelihood that the product will be illegally carried out.

RELATED DOCUMENT

Patent Document

[Patent Document 1] Japanese Patent Application Publication No. 2004-171241

SUMMARY OF THE INVENTION

Technical Problem

In the system in Patent Document 1, in order to determine whether or not there is a likelihood that the illegal carrying-out will occur, there is a need to determine all products that are taken up and to count the number of products that are taken up. Therefore, a processing load that is applied to a computer which realizes the system is heavy.

The present invention was made in view of the problems described above. An object of the present invention is to provide a technology that decreases a processing load on a computer that realizes prevention of illegal acts in a store.

Solution to Problem

According to an aspect of the present invention, there is provided an information processing apparatus including: 1) a detection unit that detects that a customer takes up a product from a display area, using a captured image in which the display area is included; and 2) a generation unit that generates customer information which indicates, in association with an identifier of the customer, the number of times of that the customer takes up the product. The generation unit sets the number of times to zero, in a case where the customer makes payment for the products.

According to another aspect of the present invention, there is provided an information processing apparatus including: 1) a detection unit that detects that a customer takes up a product from a display area, using a captured image in which the display area is included; and 2) a generation unit that generates customer information which indicates, in association with an identifier of the customer, the number of times of that the customer takes up the product and information indicating whether or not the customer makes payment for the products.

According to still another aspect of the present invention, there is provided a control method that is controlled by a computer. The control method includes: 1) a detection step of detecting that a customer takes up a product from a display area, using a captured image in which the display area is included; and 2) a generation step of generating customer information that indicates, in association with an identifier of the customer, the number of times of that the customer takes up the product. In the generation step, the number of times is set to zero in a case where the customer makes payment for the products.

According to still another aspect of the present invention, there is provided a control method that is controlled by a computer. The control method includes: 1) a detection step of detecting a face that a customer takes up a product from a display area, using a captured image in which the display area for a product is included; and 2) a generation step of generating customer information that indicates, in association with an identifier of the customer, the number of times of that the customer takes up the product from the display area and information indicating whether or not the customer makes payment for the products.

According to still another aspect of the present invention, there is provided a program that causes a computer to perform each step in the control method according to the present invention.

Advantageous Effects of Invention

According to the present invention, a technology is provided that decreases a processing load on a computer that realizes prevention of illegal acts in a store.

BRIEF DESCRIPTION OF THE DRAWINGS

The object described above and other objects, and features and advantages are further made apparent by suitable example embodiments that will be described below and the following drawings that accompany such example embodiments.

FIG. 2 is a diagram illustrating customer information in a table format.

FIG. 9 is a diagram illustrating customer information according to a first modification example, which is in a tablet format.

FIG. 11 is a diagram illustrating a table that shows the acquisition count each time the customer comes to a store.

DESCRIPTION OF EXAMPLE EMBODIMENTS

Figure 1:
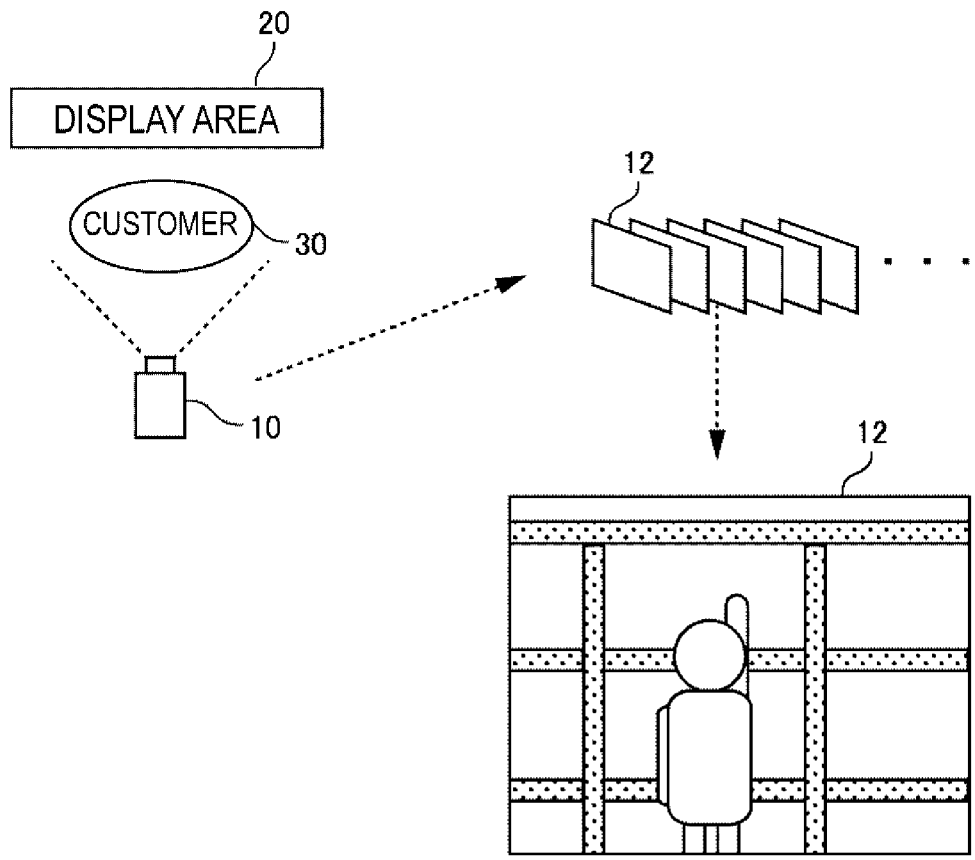
FIG. 1 is a diagram illustrating operation of an information processing apparatus according to a first example embodiment

Example embodiments of the present invention will be described below with reference to the drawings. Moreover, in all the drawings, the same constituent elements are given the same reference numeral, and descriptions thereof will not be repeated. Furthermore, in each block diagram, unless particularly described otherwise, each block represents a configuration per a per-function basis instead of a per-hardware basis.

First Example Embodiment

FIG. 1 is a diagram illustrating an information processing apparatus 2000 according to a first example embodiment. Note that, FIG. 1 is a diagram for providing an easy understanding of operation of the information processing apparatus 2000 and does not limit the operation of the information processing apparatus 2000.

A camera 10 is a camera that is installed in a store, e.g. surveillance camera. The camera 10 captures a display area 20 that is prepared in the store, and generates a captured image that represents a result of the capturing. For example, the captured image 12 is a video frame that constitutes video data which is generated by the camera 10. The display area 20 is an area in which products are displayed, e.g. product shelf.

The information processing apparatus 2000 performs an image analysis of the captured image 12, and thus determines the number of times that the customer 30 takes up a product from the display area 20. The number of times that the customer 30 takes up the product from the display area 20 is hereinafter expressed as acquisition count.

The information processing apparatus 2000 manages the acquisition count for every customer 30 in such a manner that it can be recognized a fact that "a customer who takes up a product from the display area 20 goes out of the store without paying for the product". To do so, the information processing apparatus 2000 generates information indicating the acquisition count by the customer 30 in association with an identifier of the customer 30. This information is hereinafter referred to as customer information.

The customer information indicates the identifier of the customer 30 and the acquisition count by the customer 30 in a manner where they are associated with each other. Here, if the customer 30 who comes to the store makes payment for products, the information processing apparatus 2000 sets the acquisition count by the customer 30 to 0. More precisely, the acquisition count indicated by the customer information is 0 in a case 1) where the customer has not taken up a product even one time, or 2) where the customer takes up products and then pay for the products. On the other hand, in a case where a customer takes up a product and does not pay for the product, the acquisition count indicated by the customer information is a value of 1 or greater.

FIG. 2 is a diagram illustrating the customer information in a tablet format. A table that is illustrated in FIG. 2 is described as a table 200. The table 200 has two columns: a customer identifier 202 and an acquisition count 204. For example, the information processing apparatus 2000 generates and updates a record in the table 200 for every customer, and thus monitors the acquisition count by each customer.

Figure 3:
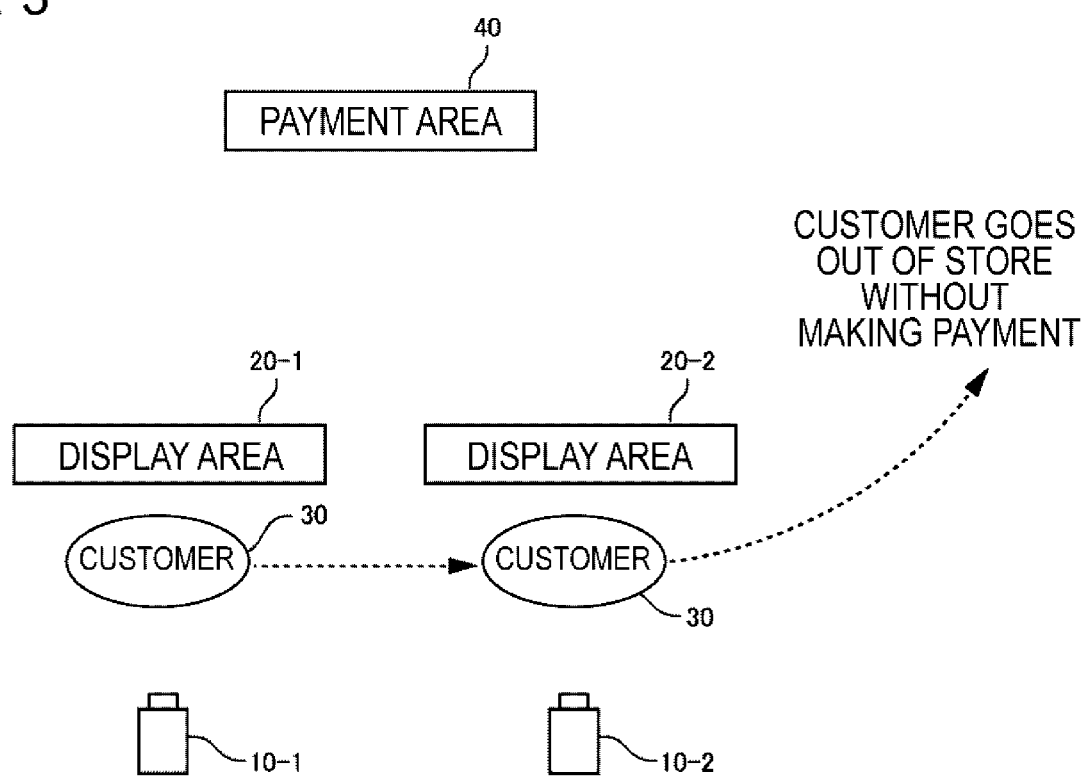
FIG. 3 is a diagram illustrating a movement of a customer.
Figure 4:
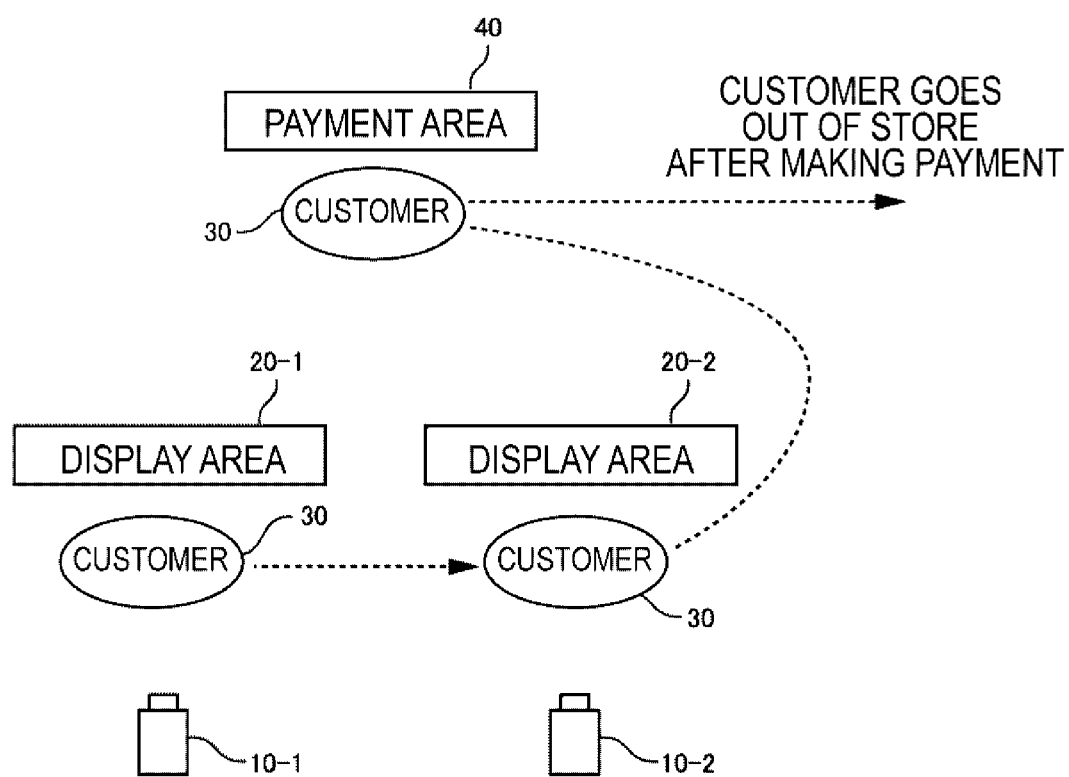
FIG. 4 is a diagram illustrating a movement of the customer.

FIGS. 3 and 4 are diagrams each of which illustrates a movement of the customer 30. Examples in FIGS. 3 and 4 have in common that the customer 30 takes up one product at a time from each of the display area 20-1 and the display area 20-2. However, in the example in FIG. 3, the customer 30 goes out of the store without making payment for the products. In an example in FIG. 4, the customer 30 makes payment for the products and goes out of the store.

In a case in FIG. 3, the information processing apparatus 2000 analyzes the captured image 12 that is generated by a camera 10-1, and thus detects that the customer 30 takes up a product from the display area 20-1. Moreover, the information processing apparatus 2000 analyzes the captured image 12 that is generated by a camera 10-2, and thus detects that the customer 30 takes up a product from the display area 20-2. Thereafter, the customer 30 goes out of the store without making payment for the products. Therefore, the record in the table 200 that represents the customer information on the customer 30 shows 2 in the acquisition count 204.

On the other hand, in a case in FIG. 4, the customer 30 takes up the products, and then goes to a payment area 40, makes payment for the products and goes out of the store. Therefore, the record in the table 200 that represents the customer information on the customer shows 0, instead of 2, in the acquisition count 204.

With the information processing apparatus 2000 according to the present example embodiment, based on whether or not the acquisition count associated with the identifier of the customer 30 is 1 or greater, it can be recognized whether or not the customer 30 who takes up products goes out of the store without making payment for the products. Specifically, if the acquisition count associated with the identifier of the customer 30 is 1 or greater, it is understood that the customer 30 takes up products and goes out of the store without making payment for the product. For example, as illustrated in FIG. 3, with the customer information indicating a value of 1 or greater in the acquisition count 204, "the customer who takes up products and does not make payment for the products" can be recognized. On the other hand, as illustrated in FIG. 4, with the customer information indicating a value of 0 in the acquisition count 204, "the customer who takes up products and makes payment for the products" can be recognized. Consequently, it can be recognized that there is a likelihood that a product will be stolen, and a customer who is likely to have stolen the product can be easily recognized.

Furthermore, with the information processing apparatus 2000 according to the present example embodiment, in a case where the customer 30 makes payment for the products, regardless of the number of products for which payment is made, the acquisition count is changed to 0. With this method, there is no need to determine which product the customer 30 takes up. Furthermore, there is no need to precisely count the number of acquired products. For example, in a case where a customer takes up multiple products at a time, the acquisition count can also be handled as 1. Consequently, a processing load on an apparatus which realizes prevention of an illegal act in the store decreases compared with a case where a product that the customer 30 takes up has to be determined, or where the number of products that the customer takes up has to be precisely counted.

Note that, the information processing apparatus 2000 may be able to at least determine "the customer 30 who takes up products from the display area 20 and goes out of the store without making payment for the products". Therefore, for example, pieces of information on one or both of 1) the customer 30 who does not take up products from the display area 20 and 2) the customer 30 who takes up products from the display area 20 and goes out of the store without making payment for the products may be deleted after the customer 30 goes out of the store.

The present example embodiment will be described in more detail below.

<Example of a Function Configuration>

Figure 5:
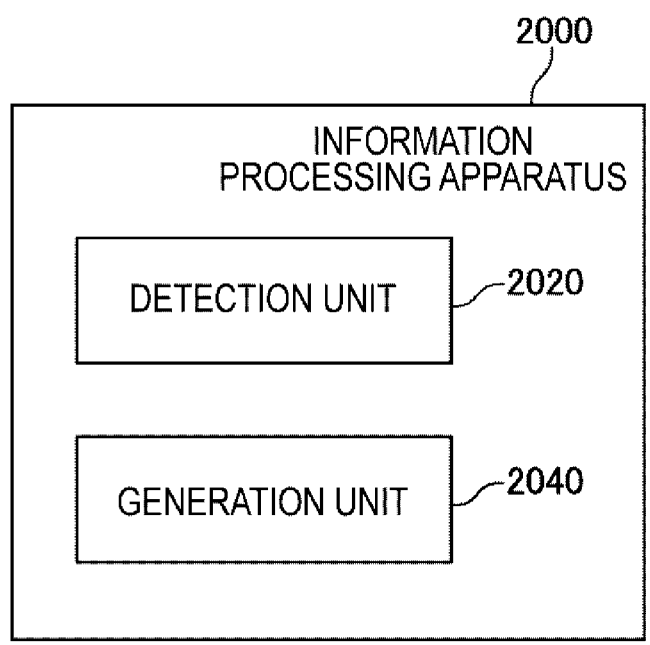
FIG. 5 is a diagram illustrating a functional configuration of the information processing.

FIG. 5 is a diagram illustrating a functional configuration of the information processing apparatus 2000. The information processing apparatus 2000 has a detection unit 2020 and a generation unit 2040. Using the captured image 12, the detection unit 2020 detects that the customer 30 takes up a product from the display area 20. The generation unit 2040 generates the customer information described above.

<Example of Hardware Configuration of the Information Processing Apparatus 2000>

Each functional constituent unit of the information processing apparatus 2000 may be realized using a piece of hardware (for example, a hard-wired electronic circuit) that realizes the functional constituent unit, and may be realized using a combination (a combination of an electronic circuit and a program controlling the electronic circuit, or the like) of a piece of hardware and software. A case where each functional constituent unit of the information processing apparatus 2000 is realized using the combination of a piece of hardware and software will be further described below.

Figure 6:
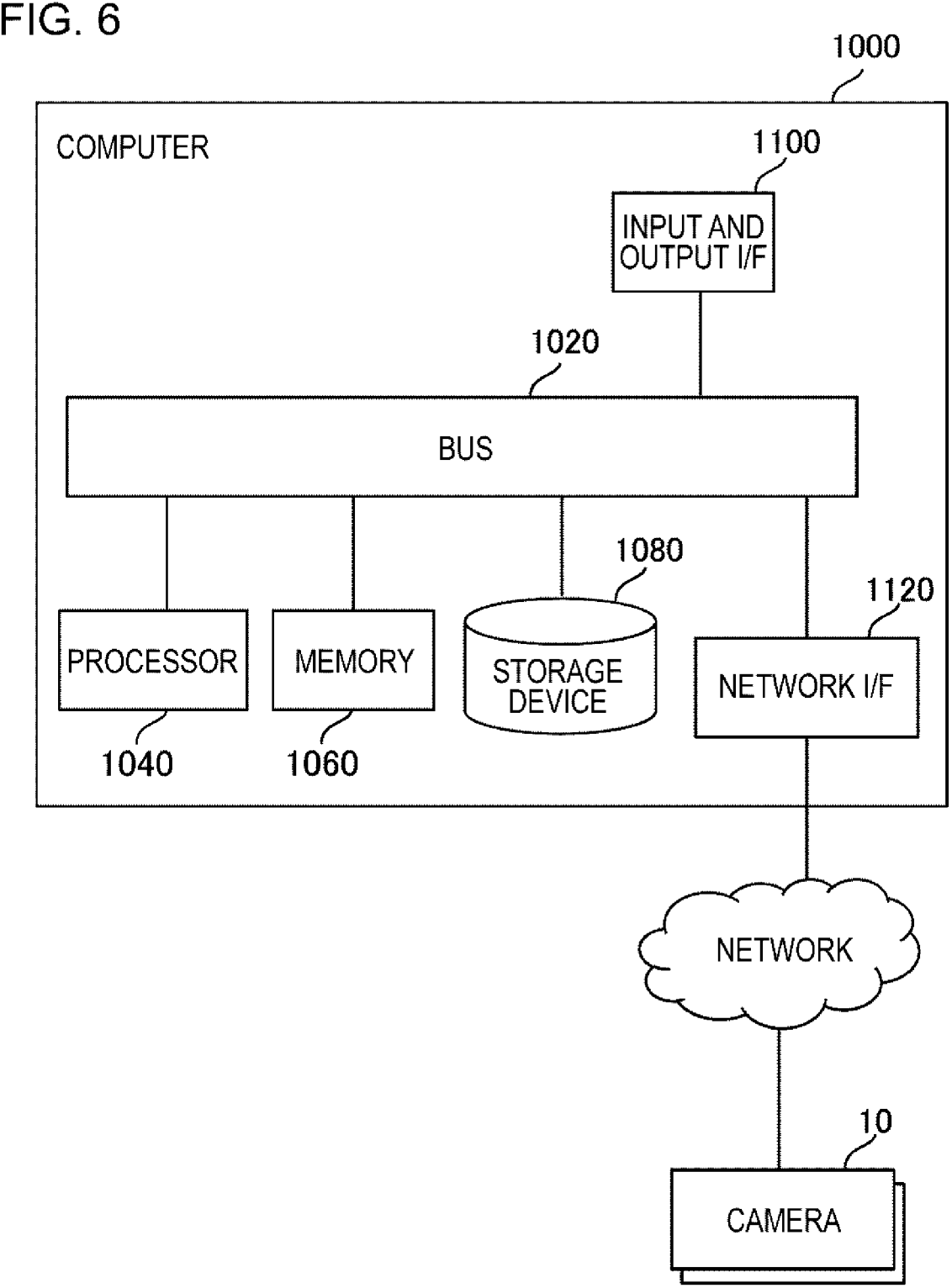
FIG. 6 is a diagram illustrating a computer for realizing the information processing.

FIG. 6 is a diagram illustrating the information processing apparatus 2000 that realizes a computer 1000. For example, the computer 1000 is a store server for performing management of the store. However, the computer 1000 is not limited to a server machine and is realized using various computers. For example, the computer 1000 is realized using a Personal Computer (PC), a tablet terminal, a smartphone, or the like. The computer 1000 may be a dedicated computer that is designed for realizing the information processing apparatus 2000, and may be an all-purpose computer.

The computer 1000 has a bus 1020, a processor 1040, a memory 1060, a storage device 1080, an input and output interface 1100, and a network interface 1120. The bus 1020 is a data transfer path along which the processor 1040, the memory 1060, the storage device 1080, the input and output interface 1100, and the network interface 1120 transmit and receive data to and from each other. The processor 1040 is an arithmetic operation device such as a Central Processing Unit (CPU), a Graphic Processing Unit (CPU), or the like. The memory 1060 is a main storage device that is realized using a Random Access Memory (RAM). The storage device 1080 is an auxiliary storage device that is realized using a hard disk, a Solid State Drive (SSD), a memory card, and a Read Only Memory (ROM), or the like.

The input and output interface 1100 is an interface for connecting between the computer 1000 and an input and output device. For example, an input device such as a keyboard and an output device such as a disk array device are connected to the input and output interface 1100.

The network interface 1120 is an interface for making a connection to a communication network. The network interface 1120 may be an interface for making a connection to the communication network through a wireless line and may be an interface for making a connection to the communication network through a wireless line. In FIG. 6, the computer 1000 is connected to the camera 10 through the network interface 1120.

A program module that realizes each function of the information processing apparatus 2000 is stored in the storage device 1080. The processor 1040 reads these program modules into the memory 1060 for execution, and thus realizes functions that correspond to the program modules, respectively.

The hardware configuration of the computer 1000 is not limited to the configuration that is illustrated in FIG. 6, and various configurations are employed. For example, a method of connecting the processor 1040 and other components to each other is not limited to a bus connection. Furthermore, the computer 1000 may be connected to the camera 10 through the input and output interface 1100. Furthermore, the computer 1000 may not be connected to the camera 10.

Note that, the information processing apparatus 2000 may be realized using multiple computers. For example, a function of the detection unit 2020 and a function of the generation unit 2040 are realized with different computers. In this case, for example, the function of the detection unit 2020 may be realized in the camera 10 that generates the captured image 12. For example, the camera 10 performs an image analysis on the captured image 12 that is generated by the camera 10 itself, and thus detects that the customer 30 takes up a product. Then, for example, the camera 10 notifies a computer that has the function of the generation unit 2040, of a customer identifier of a customer that takes up a product. According to this notification, the generation unit 2040 increases the acquisition count that is indicated by the customer information which is determined by the notified customer identifier, by 1.

<Flow for Processing>

Figure 7:
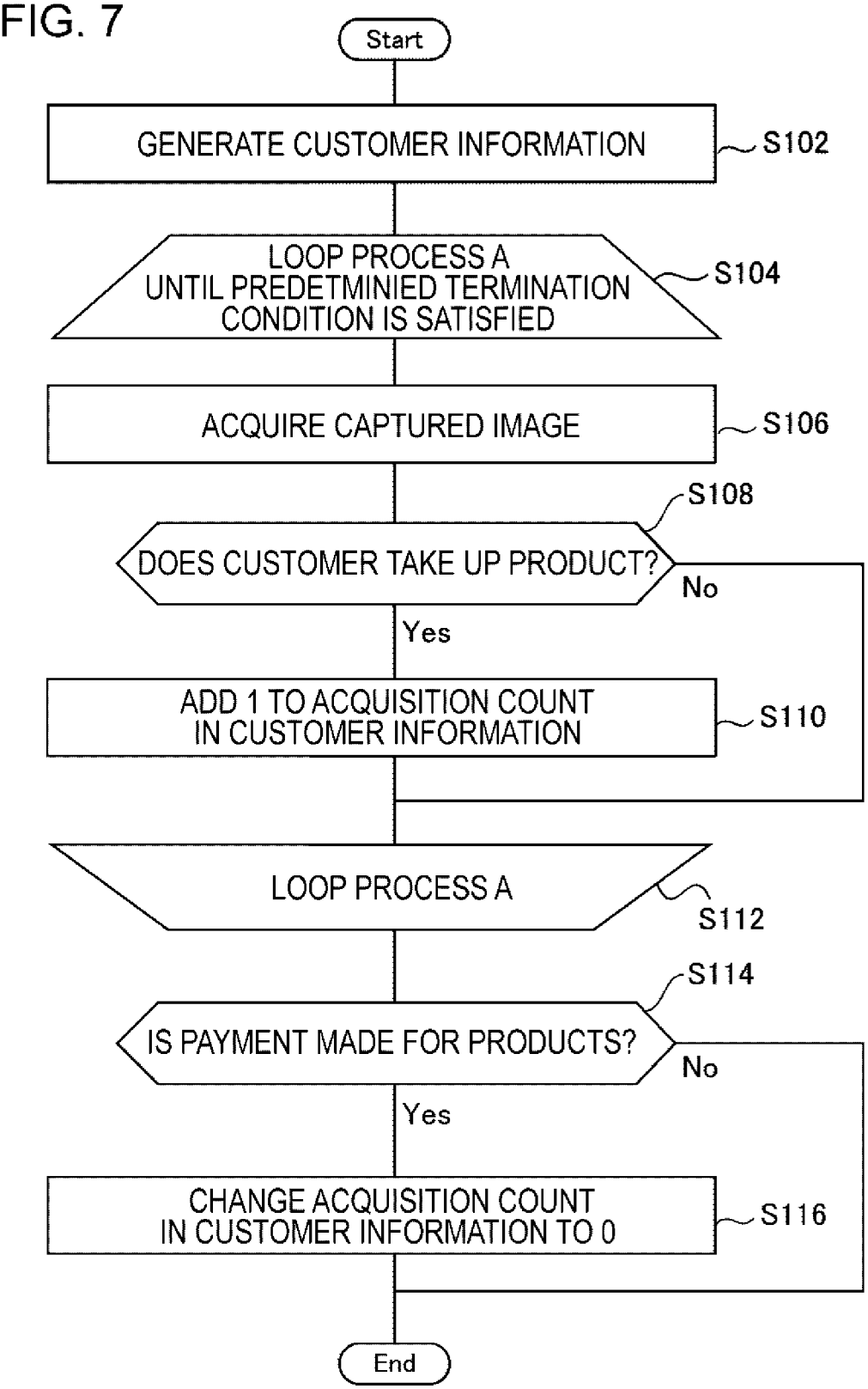
FIG. 7 is a flowchart illustrating a flow for processing that is performed by the information processing apparatus according to the first example embodiment in order to monitor customer information on a certain customer.

FIG. 7 is a flowchart illustrating a flow for processing that is performed by the information processing apparatus 2000 according to the first example embodiment in order to monitor the customer information on a certain customer 30. The generation unit 2040 generates the customer information on the customer 30 (S102). The customer information generated here indicates the identifier of the customer 30 in the customer identifier and 0 in the acquisition count.

S104 to S112 is a loop process A that is repeatedly performed until a predetermined termination condition is satisfied. In a case where, in S104, the predetermined termination condition is satisfied, processing in FIG. 7 proceeds to S114.

If the predetermined termination condition is not satisfied in S104, the detection unit 2020 acquires the captured image 12 (S106). Using the captured image 12, the detection unit 2020 determines whether or not a customer takes up a product (S108). In a case where it is determined that a customer takes up a product (YES in S108), the generation unit 2040 adds 1 to the acquisition count that is indicated by the customer information (S110). In a case where it is determined that a customer does not take up (NO in S108), processing in FIG. 7 proceeds to S112. Because S112 is an end of the loop process A, the processing in FIG. 7 proceeds to S105.

A condition for terminating the loop process A is to satisfy at least one of a condition of "the customer 30 makes payment for products" and a condition of "the customer 30 goes out of the store". As described above, if the termination condition is satisfied, the processing in FIG. 7 proceeds to S115. The generation unit 2040 determines whether or not the customer 30 makes payment for products (S115). In a case where the customer 30 makes payment for products (YES in S115), the acquisition count that is indicated by the customer information is changed to 0 (S116). On the other hand, in a case where the customer 30 does not make payment for products (NO in S115), the processing in FIG. 7 is ended. In this case, the acquisition count that is indicated by the customer information is a value that is counted by the loop process A.

<Acquisition of the Captured Image 12: S106>

The detection unit 2020 acquires the captured image 12 (S102). The captured image 12 is an image in which the display area 20 is included. In other words, the display area 20 is within an angle of view of the camera 10.

A method for the detection unit 2020 to acquire the captured image 12 is arbitrary. For example, the detection unit 2020 accesses a storage device in which the captured image 12 is stored, and thus acquires the captured image 12. The storage device in which the captured image 12 is stored may be provided within the camera 10 that generates the captured image 12, and may be provided outside of the camera 10. In addition, for example, the detection unit 2020 may receive the captured image 12 from the camera 10, and thus may acquire the captured image 12.

One or more cameras 10 are installed in a store in which the information processing apparatus 2000 is used. The detection unit 2020 acquires the captured image 12 that is generated by each camera 10.

<Detection that a Product is Taken Up: S108>

The detection unit 2020 performs an image analysis of the captured image 12, and thus detects that the customer 30 takes a product from the display area 20. A method of detecting this is arbitrary. For example, the detection unit 2020 analyzes one or more captured image 12, and thus detects that the customer 30 performs an action to take up a product. For example, this action is an action of "moving a hand towards the display area 20 and then moving that hand away from the display area 20". In response to that the action of the customer 30 to take up a product is detected as a result of the analysis of the captured image 12, the detection unit 2020 detects the fact that the customer 30 takes up the product.

In another example, the detection unit 2020 may also detect a decrease in the number of products displayed in the display area 20 using the captured image 12, and thereby detecting the fact that the customer 30 takes up a product. In this case, the detection unit 2020 analyzes one or more captured images 12 in which the display area 20 is included, which are generated during a period from when the customer 30 moves towards the display area 20 to when the customer 30 moves away from the display area 20. More specifically, the detection unit 2020 analyzes one or more captured images 12 that are generated by a certain camera 10, and thus determines a point in time when the customer 30 enters a capturing range of the camera 10 and a point in time when the customer 30 moves out of the capturing range of the camera 10. Then, the detection unit 2020 compares the display area 20 that is included in the captured image 12 generated by the camera 10 at the former point in time or close to that point in time with the display area 20 that is included in the captured image 12 generated by the camera 10 at the latter point in time or close to that point in time, and thus determines whether or not the number of products that are displayed in the display area 20 decreases. Then, in response to the determination that the number of products decreases, the detection unit 2020 detects the fact that the customer 30 takes up a product.

<Method of Identifying a Customer>

In order to monitor the number of times that every customer acquires a product, there is a need to identify customers 30 that are different from each other. For this reason, the customer identifier described above is used. For example, a feature value representing a feature of an appearance of the customer 30 is used as the customer identifier. For example, a value representing a feature of a face, a body shape, clothes, belongs, or the like can be used as a feature value of the customer 30. However, in a case where the customer information on the customer 30 is monitored over a period of time during which the customer 30 comes to the store multiple times, it is suitable to use a feature value representing a feature of a face, a body shape, or the like that is less likely to change.

When analyzing the captured image 12, the detection unit 2020 not only detects that a product is taken up, but also determines who takes up the product. For this reason, the detection unit 2020 computes the feature value of the customer 30 included in the captured image 12, and detects that the customer 30 that has the computed feature value takes up a product. Note that, an existing technology can be used as a technology that computes a feature value of a person using an image in which the person is captured.

<Generation and Update of the Customer Information: S102, S110, and S116>

The generation unit 2040 performs generation and update of the customer information (S102, S110, and S116). For example, in response to a certain customer 30 store-visit, the generation unit 2040 generates the customer information on the customer 30. The customer identifier that is indicated by the customer information, for example, is the feature value of the customer 30. Furthermore, an initial value of the acquisition count that is indicated by the customer information is 0. In response to the detection unit 2020's detection that the customer takes up a product, the generation unit 2040 adds 1 to the acquisition count of the customer information on the customer 30. Moreover, in a case where it is detected that the customer 30 makes payment for the products, the generation unit 2040 changes the acquisition count that is indicated by the customer information on the customer 30, to 0.

<Detection that the Customer 30 Comes to the Store and Goes Out of the Store>

There are various methods of detecting that the customer 30 comes to the store and that the customer 30 goes out of the store. For example, a camera is installed in the vicinity of an entrance of the store or in the vicinity of an exit of the store, and a captured image that is generated by the camera is analyzed. Thus, it is detected that the customer 30 comes to the store and goes out of the store. Specifically, the information processing apparatus 2000 analyzes the captured image that is generated by the camera which is installed in the vicinity of the entrance, and thus computes the feature value of the customer 30 who comes through the entrance. In the same manner, the information processing apparatus 2000 analyzes the captured image that is generated by the camera which is installed in the vicinity of the exit, and thus computes the feature value of the customer 30 who goes through the exit. By doing this, the customer 30 who comes to the store or the customer 30 who goes out of the store can be determined. For example, in an example in FIG. 7, the generation unit 2040 performs S102 in response to that the feature value of the customer 30 who comes to the store is computed, and generates the customer information indicating the feature value in the customer identifier.

Note that, a method of detecting the customer 30 comes to the store and goes out of the store is not limited to the method described above. For example, in some cases, in a membership store or the like, a customer is authenticated at an entrance or an exit. For example, in response to the authentication being performed using a membership card, a gate at the entrance or the exits is opened. The information processing apparatus 2000 that operates in the store in which the authentication of a customer is performed in this manner may detect that the customer 30 comes to the store and goes out of the store, in response to the authentication of the customer 30.

Note that, for the authentication, a membership number or the like that is read from the membership card may be used instead of the feature value of the customer 30. In this case, the feature value of the customer 30 and information (hereinafter referred to authentication information) such as the membership number used for the authentication of the customer 30 are associated with each other. By doing this, in a case where the customer 30 who comes to the store or goes out of the store is authenticated, the information processing apparatus 2000 can determine the feature value of the customer 30.

Figure 8:
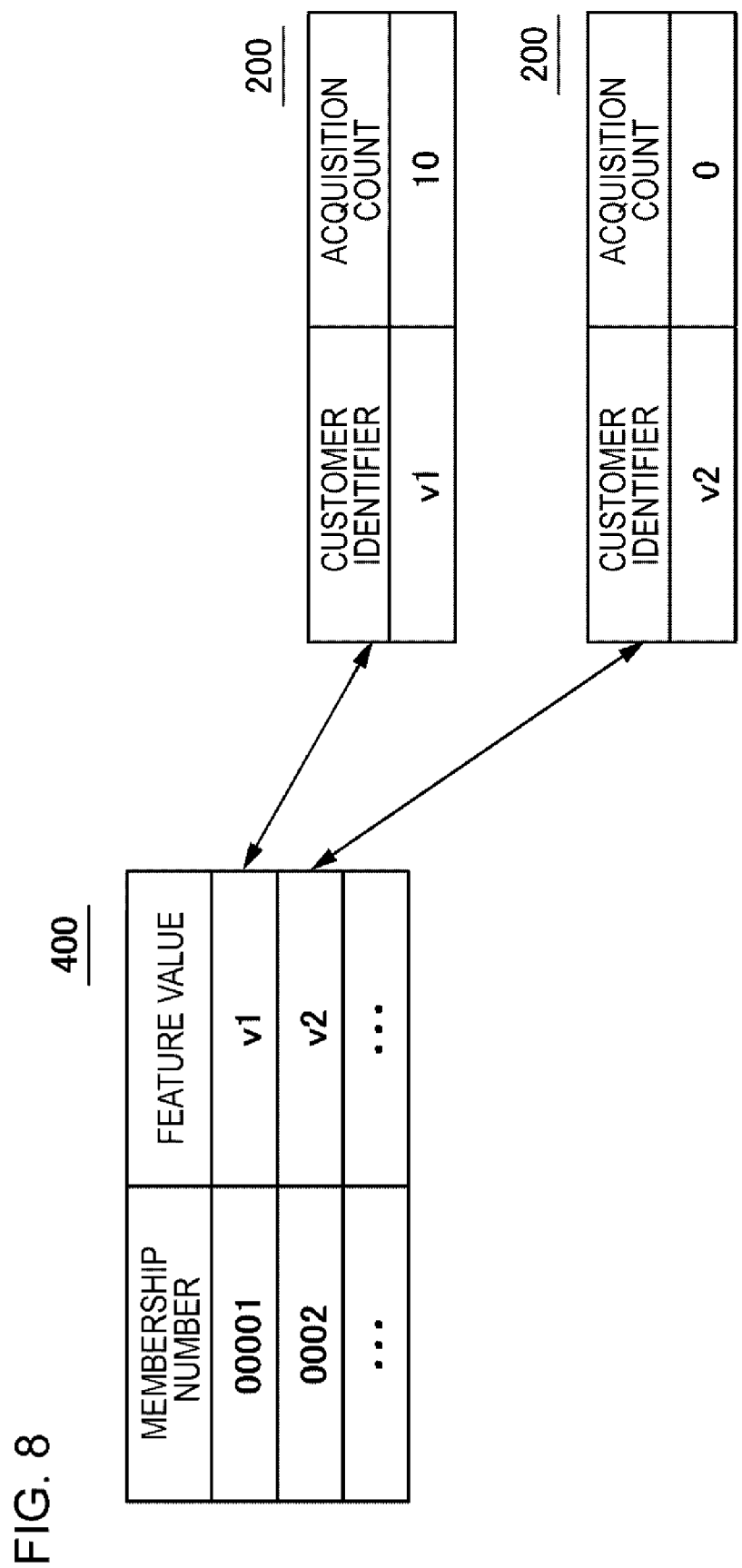
FIG. 8 is a diagram illustrating a state where authentication information and a feature value of a customer are associated with each other.

FIG. 8 is a diagram illustrating a state where the authentication information and the feature value of the customer 30 are associated with each other. A table 400 in FIG. 8 associates the authentication information and the feature value of the customer with each other. The authentication information, for example, is a membership number described above. As illustrated in FIG. 8, the customer information that is generated by the generation unit 2040 is associated with the authentication information through the feature value of the customer.

<Detection that Payment is Made for a Product>

In a case where the customer 30 makes payment for products, the generation unit 2040 sets the acquisition count by the customer 30 to 0 (S116). For this reason, the generation unit 2040 needs to detect that the customer 30 makes payment for the products. This detection method, for example, is similar to the method of detecting that the customer 30 comes to the store or goes out of the store. For example, a camera is installed in a place in which payment is made for products, e.g. a register counter. Then, the information processing apparatus 2000 analyzes a captured image that is generated by the camera, and thus determines the feature value of the customer 30. By doing this, the customer 30 who makes payment for the products can be determined. For example, in the example in FIG. 7, in a case where the feature value of the customer 30 who makes payment for the products in this manner is computed, the condition for terminating the loop process A in FIG. 7 (S104) that is performed for the customer 30 is satisfied, and the processing in FIG. 7 proceeds to next. Moreover, a result of the determination in S115 is YES, and the acquisition count that is indicated by the customer information is changed to 0 (S116).

Furthermore, as described above, in a case where the customer 30 is identified with his/her membership card or the like, when the customer 30 makes payment for products, the identification of the customer is also performed with the membership card or the like. In this case, based on information that is obtained from the membership card or the like, the information processing apparatus 2000 may determine the customer 30 who makes payment for the products. For example, in a case where the customer 30 provides his/her membership card and makes payment for the products, the information processing apparatus 2000 determines the feature value of the customer 30 which is associated with a membership number that is obtained from the membership card. Then, the generation unit 2040 sets the acquisition count of the customer information that is indicated by the feature value, to 0.

<Timing at which the Processing Sequence is Performed>

A timing at which the information processing apparatus 2000 performs the above-described sequence of the processes (for example, the processes that is illustrated in the flowchart in FIG. 7) is arbitrary. For example, the information processing apparatus 2000 periodically performs the process of detecting that the customer 30 comes to the store, and performs the sequence of processes for the customer 30 if the customer 30 has come to the store. In this case, as so-called real-time processing, the sequence of the processes by the information processing apparatus 2000 is performed.

In another example, the information processing apparatus 2000 may perform the sequence of the processes described above, as so-called batch processing. For example, the information processing apparatus 2000 performs the generation and the update of the customer information for each customer 30 once per day using captured images that are generated by each camera at that day and information on the customer who comes to the store (for example, the membership number or the like).

Modification Example

The information processing apparatus 2000 described above may be, for example, realized as a modification example described as follows. The modification example that will be described below is expressed as an "information processing apparatus 2000 of a first modification example". A functional configuration of the information processing apparatus 2000 of the first modification example is, for example, illustrated in FIG. 5 in the similar manner to the functional configuration of the information processing apparatus 2000 according to the first example embodiment. The information processing apparatus 2000 of the first modification example has the same function as the information processing apparatus 2000 of the first example embodiment, except for the following description.

In the information processing apparatus 2000 of the first modification example, the customer information indicates the acquisition count by the customer 30 and information for determining whether or not the customer 30 makes payment for products, in association with the identifier of the customer 30. The information for determining whether or not the customer 30 makes payment for the products is hereinafter expressed as payment flag. With the customer information, by using the payment flag that is associated with the identifier of the customer 30, it can be recognized whether or not the customer 30 who takes up a product goes out of the store without making payment for the products.

FIG. 9 is a diagram illustrating the customer information of the first modification example, which is in a tablet format. The table that is illustrated in FIG. 9 is expressed as a table 300. The table 300 has three fields, a customer identifier 302, the acquisition count 304, and a payment flag 306.

The information processing apparatus 2000 of the first example embodiment causes a value of the payment flag to be different, depending on whether or not the customer 30 makes payment for products. Specifically, in a case where the customer 30 makes payment, the information processing apparatus 2000 of the first modification example causes the payment flag in the customer information to have a value (for example, "payment made" or "1") indicating that a customer makes payment for products. On the other hand, in a case where the customer 30 does not make payment, the information processing apparatus 2000 of the first modification example causes the payment flag in the customer information to have a value indicating that a customer does not make payment for products (for example, "without payment made" or "0").

Note that, in a case where a customer makes payment for products, the information processing apparatus 2000 of the first example embodiment sets the acquisition count indicated in the customer information to 0. In contrast to this, in the case of the information processing apparatus 2000 of the first modification example, the number of times that the customer 30 acquires a product is shown in the acquisition count 304, regardless of whether or not the customer 30 makes payment.

With the information processing apparatus 2000 that is the first example embodiment, in a similar manner to the information processing apparatus 2000 of the first example embodiment, there is no need to determine whether or not the customer 30 takes up a product, and there is also no need to precisely count the number of acquired products. Consequently, a processing load on the apparatus which realizes prevention of an illegal act in the store decreases compared with a case where a product that the customer 30 takes up has to be determined, or where the number of products that the customer 30 takes up has to be precisely counted.

Moreover, with the information processing apparatus 2000 of the first modification example, "the customer 30 who goes out of the store without taking up a product" and "the customer 30 who takes up a product and makes payment for the products" can be easily distinguished using the customer information. Consequently, the information on the customer can be recognized in more detail.

Second Example Embodiment

Figure 10:
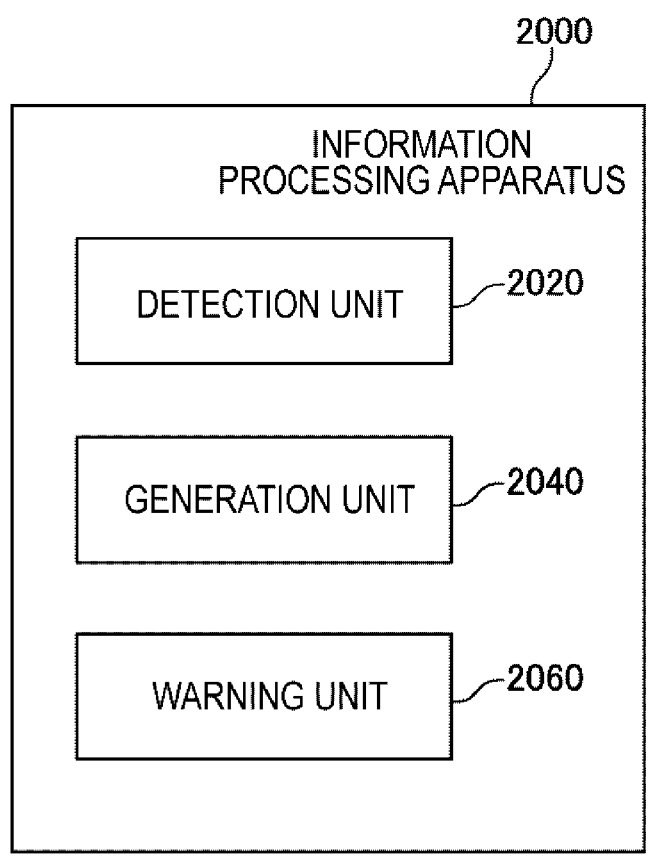
FIG. 10 is a block diagram illustrating an information processing apparatus according to a second example embodiment.

FIG. 10 is a block diagram illustrating an information processing apparatus 2000 according to a second example embodiment. The information processing apparatus 2000 according to the second example embodiment has the same function as the information processing apparatus 2000 according to the first example embodiment, except for the following description.

The information processing apparatus 2000 of the second example embodiment has a warning unit 2060. In a case where a predetermined condition relating to the customer 30 is satisfied, the warning unit 2060 performs a process of warning the customer 30. At this point, the customer 30 that is a target for warning process is expressed as a "customer 30 to be warned".

As the predetermined condition described above, various conditions can be employed.

As an example, a variance of the predetermined condition will be described below.

First Example of the Predetermined Condition

First, it is assumed that, in a case where the customer 30 comes multiple times to the store, the customer information is set to indicate the acquisition count each time the customer 30 comes to the store. FIG. 11 is a diagram illustrating the table 200 that shows the acquisition count each time the customer comes to a store. The table 200 in FIG. 11 has a store-visit number 206. The record in which the store-visit number 206 shows n is a record that indicates the acquisition count corresponding to the n-th visit to the store.

For example, the predetermined condition is a condition of "the number of times of the store-visit in which the acquisition count is the predetermined value or more, in the customer information of the customer 30". In other words, the warning process is performed when the number of the store-visits in which "the customer takes up a product and goes out of the store without making payment for the product" is a predetermined value or more for a certain customer 30.

By doing this, for the customer 30 who frequently comes to the store, who is suspected to go out of the store without making payment for a product, the warning process is performed. At this point, there is a likelihood that the customer 30 who frequently comes to the store, who is suspected to go out of the store without making payment for a product, will be a habitual thief. Accordingly, the warning process is performed using the predetermined condition described above, and thus the warning process can be performed for the customer 30 who is suspected to be the habitual thief.

Note that, the predetermined value may be set in advance to be in the warning unit 2060 and may be stored in a storage device that is accessible from the warning unit 2060.

Second Example of the Predetermined Condition

In the same manner, it is assumed that, in the case where the customer 30 comes multiple times to the store, the customer information is set to indicate the acquisition count each time the customer 30 comes to the store. For example, the predetermined condition is a condition of "a difference between the number of times of the store-visit in which the acquisition count is greater than 0 and the number of times of the store-visit in which the acquisition count is 0 is the predetermined value or more, in the customer information of the customer 30". Using this condition similarly enables to perform the warning process for the customer 30 who is suspected to frequently go out of the store without making payment for products when coming to the store (the customer 30 who is suspected to be a habitual thief).

Note that, the predetermined value may be set in advance to be in the warning unit 2060 and may be stored in a storage device that is accessible from the warning unit 2060.

Third Example of the Predetermined Condition

For example, the predetermined condition is a condition of "a total value of the numbers of times of the acquisition count for each store-visit is a predetermined value or more, in the customer information of the customer 30". For example, in a case where the customer information has a configuration as illustrated in FIG. 11, the total value of the acquisition count for a certain customer 30 is a value obtained by summing the acquisition count 204 of the records each of which indicates the identifier of the customer 30. Furthermore, in a case where this predetermined condition is used, the acquisition count in the customer information may indicate the total value of the acquisition counts in multiple store-visits.

A high value of the acquisition count for the customer 30 means that the number of products that the customer 30 is suspected to steal is great. Consequently, the warning process is performed using the predetermined condition described above, and thus the warning process can be performed for the customer 30 who is suspected to steal many products.

<Warning Process>

As the warning process that is performed by the warning unit 2060, various warning process operations can be employed. As examples, variances of the warning process will be described below.

First Example of the Warning Process

For example, the warning process is a process of outputting predetermined warning sound (buzzer sound or the like). The warning sound may be set to be heard by a store clerk and may also be set to be heard by the customer. In the former case, for example, the warning unit 2060 caused the warning sound to be output from a headphone that the store clerk wears. In the latter case, for example, the warning unit 2060 may cause the warning sound to be output from a speaker that is installed within the store.

In a case where the warning process is performed, a sequence of processes by the information processing apparatus 2000 is performed as the real-time process described above. Furthermore, it is preferable to detect that the customer 30 goes out of the store at a bit earlier point in time than that the customer 30 actually goes out of the store, e.g. at a point in time when the customer 30 moves towards the exit. By doing this, the warning sound is output at a point in time at which the customer 30 goes out of the store, or a point in time at which is somewhat earlier than such a point in time.

Second Example of the Warning Process

For example, the warning process is a process of preventing the customer 30 to be warned from going out of the store. This process is, for example, a process of closing a gate which is installed in the exit. In this case, the gate is configured in such a manner that the gate can be opened and closed under the control of the warning unit 2060. In addition, for example, in a case where the authentication is performed with the membership number or the like when the customer 30 goes out of the store, the warning process is a process of causing an error in the authentication process for the customer 30 to be warned.

In the case where the warning process is performed, the sequence of processes by the information processing apparatus 2000 is also performed as the real-time process described above. Furthermore, it is preferable to detect that the customer 30 goes out of the store at a bit earlier point in time than that the customer 30 actually goes out of the store. By doing this, the customer 30 to be warned is prevented from going out of the store at a point in time when the customer 30 to be warned goes out of the store or at a bit earlier point in time than that. As a result, the customer 30 that stole a product can be prevented from escaping from the store.

Third Example of the Warning Process

For example, the warning process is a process of providing a notification to a predetermined organization. The predetermined organization is, for example, a security company, police, or the like. This process may be performed as the real-time process and may be performed as the batch process.

Fifth Example of the Warning Process

For example, the warning process is a process of adding the customer 30 to be warned to a blacklist (information that shows a list of persons under surveillance). This processing may be performed as the real-time processing and may be performed as the batch processing.

Warning Process in Multiple Stages

The warning process that is performed by the warning unit 2060 may be divided into multiple stages. For example, multiple values are provided as predetermined values that are set in each of the above-mentioned predetermined conditions. Then, the warning unit 2060 determines a warning process to be performed in accordance with the result of the comparison between a parameter of the customer 30 used to determine whether or not a predetermined condition is satisfied (for example, the number of times of store-visit in the case of that the acquisition count is greater than 0) and each of the multiple predetermined values.

For example, it is assumed to use a condition of "the number of times of the store-visit in which the acquisition count is the predetermined value or more, in the customer information of the customer 30". Then, three predetermined values, a, b, and c, are prepared in descending order of the predetermined value. In this case, the warning unit 2060 determines the warning process to be performed, in accordance with which the number of times of store-visit in which the acquisition count is greater than 0 is: 1) equal to or greater than a and less than b; 2) equal to or greater than b and less than c; or 3) equal to or greater than c. For example, the generation unit 2040 performs the warning process for addition to the blacklist in the case of 1), performs the process of outputting the warning sound in the case of 2), and performs the process of providing a notification to a predetermined organization in the case of 3).

In addition, for example, the warning unit 2060 may cause the contents of the same type of warning process to be changed in accordance with the result of the comparison between a parameter of the customer 30 used to determine whether or not a predetermined condition is satisfied and each of the multiple predetermined values. For example, in each of the cases (1), (2), and (3) in the example described above, the generation unit 2040 causes a volume of the warning sound to differ, causes a notification destination to differ, or causes a level of surveillance (the degree of the surveillance) to be set in the blacklist to differ.

<Hardware Configuration>

A hardware configuration of a computer that realizes the information processing apparatus 2000 according to the second example embodiment, for example, is illustrated in FIG. 6 in the same manner as in the first example embodiment. However, a program module that realizes a function of the information processing apparatus 2000 according to the present example embodiment is stored in the storage device 1080 of the computer 1000 that realizes the information processing apparatus 2000 according to the present example embodiment.

Modification Example

It is also possible that the information processing apparatus 2000 described above is, for example, realized as in a modification example that is described as follows. The modification example that will be described below is expressed as an "information processing apparatus 2000 of a second modification example".

A generation unit 2040 of the information processing apparatus 2000 of the second modification example has the same function as the generation unit 2040 of the information processing apparatus 2000 of the first modification example. In other words, the customer information that is generated by the information processing apparatus 2000 of the second modification example has the same configuration as the customer information that is generated by the information processing apparatus 2000 of the first modification example (refer to FIG. 9).

A functional configuration of the information processing apparatus 2000 of the second modification example is, for example, illustrated in FIG. 10 in the same manner as the functional configuration of the information processing apparatus 2000 of the second example embodiment. The warning unit 2060 of the second modification example performs the same process as the warning unit 2060 of the present example embodiment. However, because the information processing apparatus 2000 of the second example embodiment and the information processing apparatus 2000 of the second modification example are different in information indicated by the customer information, a predetermined condition for the warning unit 2060 of the second example to perform the warning process is different from a predetermined condition for the warning unit 2060 of the second example embodiment to perform the warning process. As an example, a variance of the predetermined condition for the warning unit 2060 of the second modification example to perform the warning process will be described below.

First Example of the Predetermined Condition

For example, the predetermined condition is a condition of "the number of times of store-visit, in which the acquisition count is greater than 0 and payment is not made, is a first predetermined value or more, in the customer information of the customer 30". Note that, it can be recognized that payment is not made by using the payment flag. This predetermined condition is a condition that is satisfied in the same situation as the predetermined condition that is described in the first example of the predetermined condition in the information processing apparatus 2000 of the second example embodiment.

Second Example of the Predetermined Condition

For example, the predetermined condition is a condition of "a difference is predetermined value or more in the customer information of the customer 30, the difference being between the number of times of the store-visit, in which the acquisition count is greater than 0 and payment is not made, and the number of times of the store-visit other than such store-visit". Note that, the store-visit other than such store-visit includes "store-visit in which the acquisition count is greater than 0 and payment is made" and "store-visit in which the acquisition count is 0". This predetermined condition is a condition that is satisfied in the same situation as the predetermined condition described in the second example of the predetermined condition in the information processing apparatus 2000 of second example embodiment.

Third Example of the Predetermined Condition

For example, the predetermined condition is a condition of "a total value of the numbers of times of the acquisition count for each of the store-visit in which payment is not made is a predetermined value or more, in the customer information of the customer 30". This predetermined condition is a condition that is satisfied in the same situation as the predetermined condition described in the third example of the predetermined condition in the information processing apparatus 2000 of the second example embodiment.

The example embodiments of the present invention are described above with reference to the drawings, but these are only examples of the present invention. Combinations of the example embodiments described above, or various configurations other than those described above can be employed.

The invention claimed is:

1. An information processing apparatus comprising:
   a memory storing instructions; and
   at least one hardware processor configured to execute the instructions to implement:
      a detection of whether a customer takes up a product from a display area in a store, wherein the detection is implemented by using a captured image, of a plurality of captured images of one or more videos from inside the store, in which the display area for the product is included;
      generating customer information which indicates, in association with an identifier of the customer, an acquisition count indicating a number of times of that the customer takes up the product and any of other products in the store;
      an iterative process of repeatedly iterating the detection and an incrementing of the acquisition count based on checking whether the customer is detected to have taken up any of the other products;
      while the iterative process is iterated, checking whether the customer attempts to leave the store while the acquisition count is set to a non-zero value and controlling, in a case that it is determined that the customer attempts to leave the store while the acquisition count is set to the non-zero value, an output of an alarm by at least one of a headphone of a store clerk and a speaker installed in the store; and
      setting the acquisition count to zero and ending the iterative process, thereby reducing a processing load on the at least one hardware processor, based on determining that the customer makes a payment for the product and the other products, if any were determined to have been taken up by the customer during the iterative process.

2. The information processing apparatus according to claim 1,
   wherein the customer information indicates the acquisition count for each of a plurality of store-visits of the customer, and
   wherein the at least one hardware processor is further configured to execute the instructions to implement outputting a warning in a case where a number of times of the store-visits in which the acquisition count is greater than 0 is a first predetermined value or more.

3. The information processing apparatus according to claim 1,
   wherein the customer information indicates the acquisition count for each of a plurality of store-visits of the customer, and
   wherein the at least one hardware processor is further configured to execute the instructions to implement outputting a warning in a case where a difference between a number of times of the store-visits in which the acquisition count is greater than 0 and a number of times of the store-visits in which the acquisition count is 0 is a second predetermined value or more.

4. The information processing apparatus according to claim 1, wherein the at least one hardware processor is further configured to execute the instructions to implement outputting a warning in a case where a total value of the acquisition count in a plurality of the store-visits of the customer is a third predetermined value or more.

5. An information processing apparatus, comprising:
a memory storing instructions; and
at least one hardware processor configured to execute the instructions to implement:
    a detection of whether a customer takes up a product from a display area in a store, wherein the detection is implemented by using a captured image, of a plurality of captured images of one or more videos from inside the store, in which the display area for the product is included; and
    generating customer information which indicates, in association with an identifier of the customer, an acquisition count indicating a number of times of that the customer takes up the product and information indicating whether or not the customer makes a payment for the product and any of other products in the store;
    an iterative process of repeatedly iterating the detection and an incrementing of the acquisition count based on checking whether the customer is detected to have taken up any of the other products; and
    setting the information indicating whether or not the customer makes the payment to a value indicating that the customer makes the payment and ending the iterative process, thereby reducing a processing load on the at least one hardware processor, based on determining that the customer makes a payment for the product and the other products, if any were determined to have been taken up by the customer during the iterative process.

6. The information processing apparatus according to claim 5,
wherein the customer information indicates the acquisition count for each of a plurality of store-visits of the customer, and
wherein the at least one hardware processor is further configured to execute the instructions to implement outputting a warning in a case where a number of times of the store visits in which the acquisition count is greater than 0 and payment is not made is a first predetermined value or more.

7. The information processing apparatus according to claim 5,
wherein the customer information indicates the acquisition count for each of a plurality of store-visits of the customer, and
wherein the at least one hardware processor is further configured to execute the instructions to implement outputting a warning in a case where a difference between a number of times of the store-visits in which the acquisition count is greater than 0 and payment is not made and a number of times of the store-visits, other than the number of times of the store-visits in which the acquisition count is greater than 0 and payment is not made, is a second predetermined value or more.

8. The information processing apparatus according to claim 5, wherein the at least one hardware processor is further configured to execute the instructions to implement outputting a warning in a case where a total value of the acquisition count in a plurality of store-visits of the customer in which payment is not made is a third predetermined value or more.

9. A control method that is performed by a computer, the control method comprising:
    a detection of whether a customer takes up a product from a display area in a store, wherein the detection is implemented by using a captured image, of a plurality of captured images of one or more videos from inside the store, in which the display area for the product is included;
    generating customer information which indicates, in association with an identifier of the customer, an acquisition count indicating a number of times of that the customer takes up the product and any of other products in the store;
    an iterative process of repeatedly iterating the detection and an incrementing of the acquisition count based on checking whether the customer is detected to have taken up any of the other products;
    while the iterative process is iterated, checking whether the customer attempts to leave the store while the acquisition count is set to a non-zero value and controlling, in a case that it is determined that the customer attempts to leave the store while the acquisition count is set to the non-zero value, an output of an alarm by at least one of a headphone of a store clerk and a speaker installed in the store; and
    setting the acquisition count to zero and ending the iterative process, thereby reducing a processing load on the at least on hardware processor, based on determining that the customer makes payment for the product and the other products, if any were determined to have been taken up by the customer during the iterative process.

10. The control method according to claim 9,
wherein the customer information indicates the acquisition count for each of a plurality of store-visits of the customer,
the method further comprising outputting a warning in a case where a number of times of the store-visits in which the acquisition count is greater than 0 is a first predetermined value or more.

11. The control method according to claim 9,
wherein the customer information indicates the acquisition count for each of a plurality of store-visits of the customer,
the method further comprising outputting a warning in a case where a difference between a number of times of the store-visits in which the acquisition count is greater than 0 and a number of times of the store-visits in which the acquisition count is 0 is a second predetermined value or more.

12. The control method according to claim 9, further comprising:
outputting a warning in a case where a total value of the acquisition count in a plurality of store-visits of the customer is a third predetermined value or more.

13. A non-transitory computer-readable storage medium storing a program that causes a computer to perform each step in the control method according to claim 10.

14. A control method that is performed by a computer, comprising:
    implementing a detection of whether a customer takes up a product from a display area in a store, wherein the detection is implemented by using a captured image, of a plurality of captured images of one or more videos from inside the store in which the display area for a product is included;

generating customer information which indicates, in association with an identifier of the customer, an acquisition count indicating a number of times of that the customer takes up the product and information indicating whether or not the customer makes a payment for the product and any of other products in the store;

implementing an iterative process of repeatedly iterating the detection and an incrementing of the acquisition count based on checking whether the customer is detected to have taken up any of the other products; and setting the information indicating whether or not the customer makes the payment to a value indicating that the customer makes the payment and ending the iterative process, thereby reducing a processing load on the at least one hardware processor, based on determining that the customer makes a payment for the product and the other products, if any were determined to have been taken up by the customer during the iterative process.

15. The control method according to claim 14, wherein the customer information indicates the acquisition count for each of a plurality of store-visits of a customer, the method further comprising outputting a warning in a case where a number of times of the store-visits in which the acquisition count is greater than 0 and payment is not made is a first predetermined value or more.

16. The control method according to claim 14, wherein the customer information indicates the acquisition count for each of a plurality of store-visits of a customer, the method further comprising outputting a warning in a case where a difference between a number of times of the store-visits, in which the acquisition count is greater than 0 and payment is not made, and a number of times of the store-visits, other than the number of times of the store-visits in which the acquisition count is greater than 0 and payment is not made, is a second predetermined value or more.

17. The control method according to claim 14, further comprising:

outputting a warning in a case where a total value of the acquisition count in a plurality of store-visits of the customer in which payment is not made is a third predetermined value or more.

\* \* \* \* \*